(12) United States Patent
Koyama et al.

(10) Patent No.: US 10,978,248 B2
(45) Date of Patent: Apr. 13, 2021

(54) CAPACITOR WITH HEAT DISSIPATER

(71) Applicant: Panasonic Intellectual Property Management Co., Ltd., Osaka (JP)

(72) Inventors: Yuki Koyama, Ishikawa (JP); Akihiro Ozaki, Toyama (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 134 days.

(21) Appl. No.: 16/052,227

(22) Filed: Aug. 1, 2018

(65) Prior Publication Data

US 2018/0342350 A1 Nov. 29, 2018

Related U.S. Application Data

(63) Continuation of application No. PCT/JP2017/005043, filed on Feb. 13, 2017.

(30) Foreign Application Priority Data

Feb. 25, 2016 (JP) .............................. JP2016-034170

(51) Int. Cl.
*H01G 2/08* (2006.01)
*H01G 4/38* (2006.01)
(Continued)

(52) U.S. Cl.
CPC ............... *H01G 2/08* (2013.01); *H01G 2/04* (2013.01); *H01G 2/10* (2013.01); *H01G 4/224* (2013.01);
(Continued)

(58) Field of Classification Search
CPC ............ H01G 4/32; H01G 4/224; H01G 4/38; H01G 2/10; H01G 2/04; H01G 2/08
See application file for complete search history.

(56) References Cited

U.S. PATENT DOCUMENTS

| | | | | |
|---|---|---|---|---|
| 6,118,646 A | * | 9/2000 | Yang | H01G 4/224 174/520 |
| 2009/0195957 A1 | * | 8/2009 | Grimm | H01G 9/06 361/272 |

(Continued)

FOREIGN PATENT DOCUMENTS

| | | | | |
|---|---|---|---|---|
| GB | 1547103 A | * | 6/1979 | ............... H01G 4/32 |
| JP | 57-183736 U | | 11/1982 | |

(Continued)

OTHER PUBLICATIONS

International Search Report of PCT application No. PCT/JP2017/005043 dated Apr. 25, 2017.

*Primary Examiner* — David M Sinclair
(74) *Attorney, Agent, or Firm* — McDermott Will and Emery LLP (57) ABSTRACT

Film capacitor includes capacitor unit that has capacitor elements, upper bus bar, and lower bus bar. Capacitor elements have upper end electrodes and lower end electrodes that are connected to upper bus bar and lower bus bar, respectively. Film capacitor further includes case containing capacitor unit and being filled with filler resin, cooling plate near capacitor unit, and plate springs. Cooling plate is connected to a cooler and discharges heat generated from capacitor elements into the cooler. Plate springs apply an elastic force to capacitor unit in a direction toward cooling plate.

11 Claims, 6 Drawing Sheets

(51) Int. Cl.
　　　*H01G 4/224*　　　(2006.01)
　　　*H01G 4/228*　　　(2006.01)
　　　*H01G 2/04*　　　(2006.01)
　　　*H01G 2/10*　　　(2006.01)
　　　*H01G 4/258*　　　(2006.01)

(52) U.S. Cl.
　　　CPC ............. *H01G 4/228* (2013.01); *H01G 4/258* (2013.01); *H01G 4/38* (2013.01)

(56) References Cited

U.S. PATENT DOCUMENTS

| | | | |
|---|---|---|---|
| 2010/0039748 A1* | 2/2010 | Fujii | H01G 4/38 |
| | | | 361/274.1 |
| 2013/0021753 A1 | 1/2013 | Enami et al. | |
| 2014/0286064 A1* | 9/2014 | Kamizuma | H01G 4/258 |
| | | | 363/123 |
| 2016/0241155 A1* | 8/2016 | Takeuchi | H02M 7/003 |
| 2017/0062134 A1 | 3/2017 | Koyama et al. | |

FOREIGN PATENT DOCUMENTS

| | | | | |
|---|---|---|---|---|
| JP | 2001-167745 | | 6/2001 | |
| JP | 2003338424 A | * | 11/2003 | |
| JP | 2007150014 A | * | 6/2007 | ............... H01G 9/26 |
| JP | 2009-289943 | | 12/2009 | |
| JP | 2013-026320 | | 2/2013 | |
| JP | 2013115279 A | * | 6/2013 | |
| JP | 2015138880 A | * | 7/2015 | ............... H01G 4/32 |
| WO | 2015/182081 | | 12/2015 | |

\* cited by examiner

CAPACITOR WITH HEAT DISSIPATER

BACKGROUND

1. Technical Field

The present invention relates to a capacitor.

2. Description of the Related Art

A conventionally known capacitor has a capacitor unit in a case. The capacitor unit includes a capacitor element and a pair of bus bars connected to electrodes of the capacitor element. Some of these capacitors allow a large flow of electricity. In the capacitor of this type, the capacitor element has a high temperature because of electric current flowing through the capacitor element. Thus, the capacitor needs to be connected to a cooler to have the capacitor element cooled down (see PTL 1).

CITATION LIST

Patent Literature

PTL 1: Unexamined Japanese Patent Publication No. 2009-289943

SUMMARY

The capacitor can have a structure for cooling the capacitor element. For example, a cooling plate made from a material with excellent heat dissipation (thermal conductivity) is disposed near the capacitor unit in the case, and the cooling plate is connected to an external cooler that cools the capacitor element via the cooling plate.

However, the case containing the capacitor element is filled with a filler resin that protects the capacitor element against moisture and impact. If the capacitor has the cooling structure as described above, the filler resin may enter between the capacitor unit and the cooling plate. This may impair heat dissipation between the cooling plate and the capacitor element, resulting in an unsatisfactory cooling of the capacitor element.

In view of the above problem, it is an object of the present invention to provide a capacitor that ensures a satisfactory cooling of a capacitor element.

A capacitor according to a primary aspect of the present invention includes a capacitor unit that has a capacitor element, a first bus bar, and a second bus bar. The first and the second bus bars are respectively connected to electrodes of the capacitor element. The capacitor further includes a case containing the capacitor unit and being filled with a filler resin, a heat dissipater near the capacitor unit, and an elastic body. The heat dissipater is connected to a cooler and discharges heat generated from the capacitor element into the cooler. The elastic body applies an elastic force to the capacitor unit in a direction toward the heat dissipater.

The present invention can provide a capacitor that ensures a satisfactory cooling of a capacitor element.

Effects or meanings of the present invention will be further clarified in the following description of an exemplary embodiment. However, the exemplary embodiment described below is merely an example of implementing the present invention, and the present invention is not at all limited to the example described in the following exemplary embodiment.

DETAILED DESCRIPTION

An exemplary embodiment of the present invention will be described with reference to the accompanying drawings. For the sake of convenience, directions including front and rear, right and left, and up and down are added to the drawings as appropriate. These directions are not absolute directions but relative directions in relation to a location of film capacitor 1.

In the exemplary embodiment, film capacitor 1 corresponds to a "capacitor" described in the appended claims. Inner bottom surface 20b of case 20 corresponds to an "inner surface of a case" described in the appended claims. Fitting pawls 22 correspond to a "fitting part" described in the appended claims. Fixed ribs 24 correspond to a "fastener" described in the appended claims. Plate springs 30 correspond to an "elastic body" and a "metallic spring" described in the appended claims. Cooling plate 40 corresponds to a "heat dissipater" described in the appended claims. Insulating sheet 50 corresponds to an "insulating member" described in the appended claims. Upper end electrodes 111 and lower end electrodes 112 correspond to "electrodes" described in the appended claims. Upper bus bar 200 and lower bus bar 300 respectively correspond to a "first bus bar" and a "second bus bar" described in the appended claims.

However, the above description is only intended to define correspondences between constituents shown in the appended claims and constituents shown in the exemplary embodiment. The correspondences described above should not be construed to limit the scope of the present invention described in the appended claims to the configuration described in the exemplary embodiment.

Figure 1:
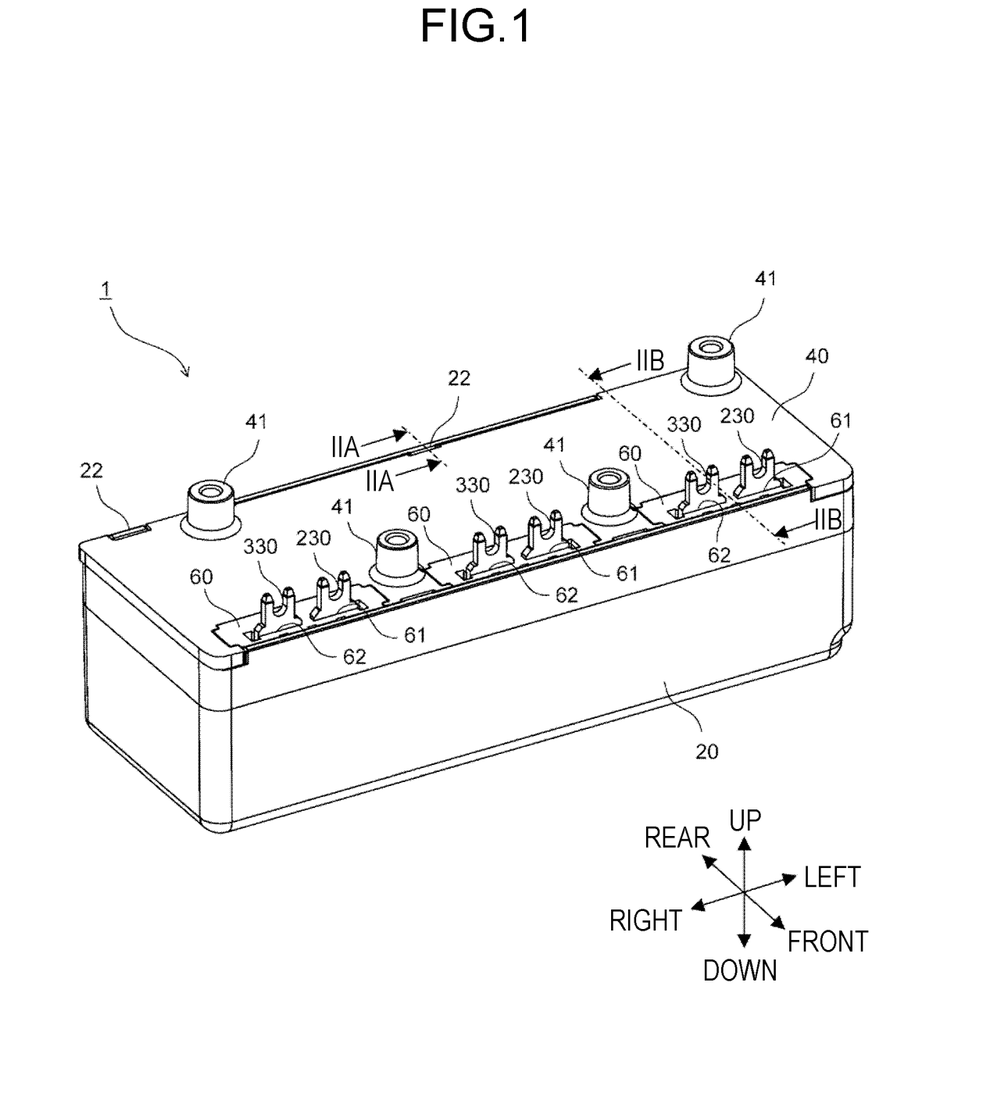
FIG. 1 is an elevation perspective view of a film capacitor according to an exemplary embodiment.
Figure 2A:
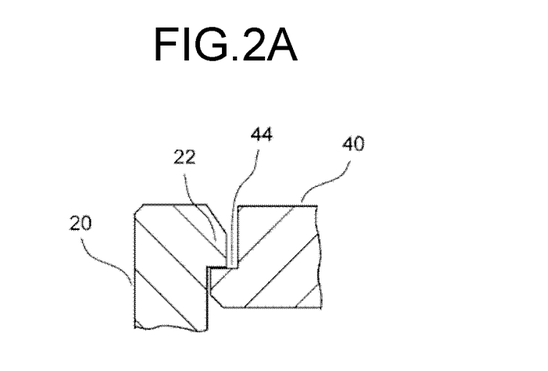
FIG. 2A is a cross-sectional view of an essential part taken along line IIA-IIA of FIG. 1 according to the exemplary embodiment.
Figure 2B:
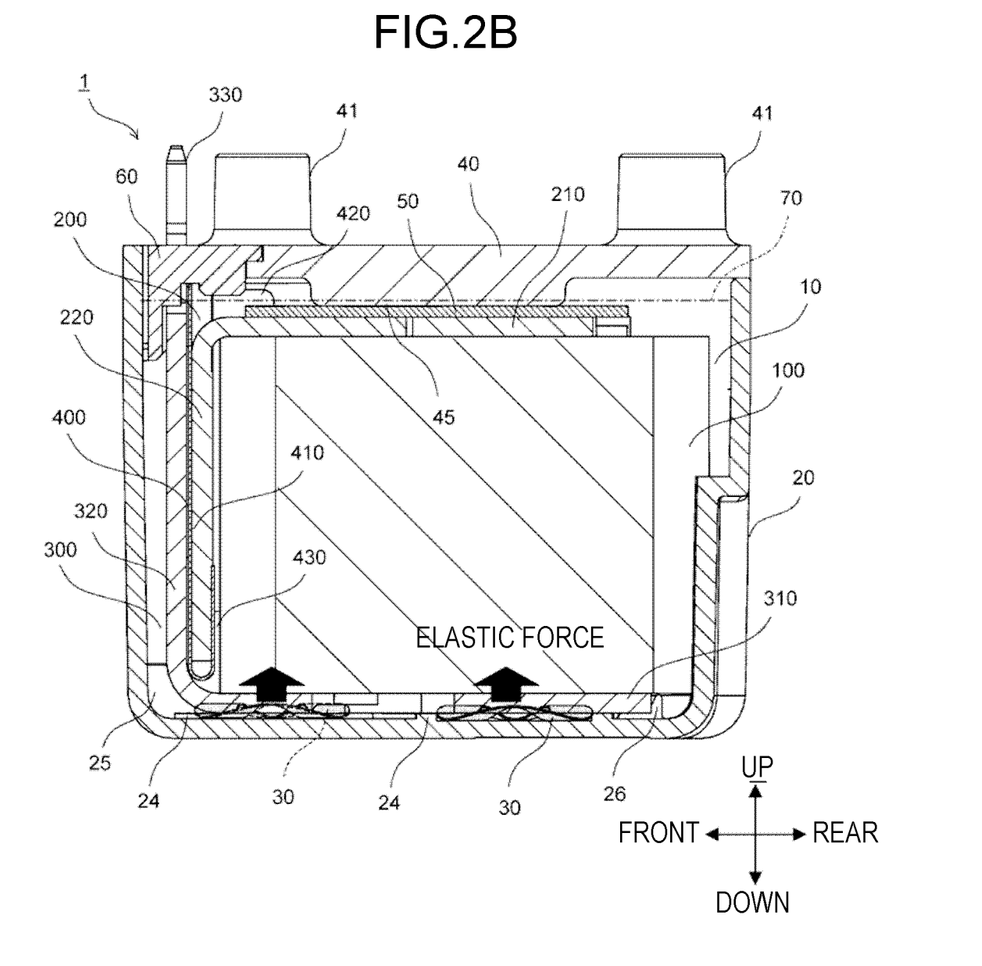
FIG. 2B is a cross-sectional view of the film capacitor taken along line IIB-IIB of FIG. 1 according to the exemplary embodiment.
Figure 3:
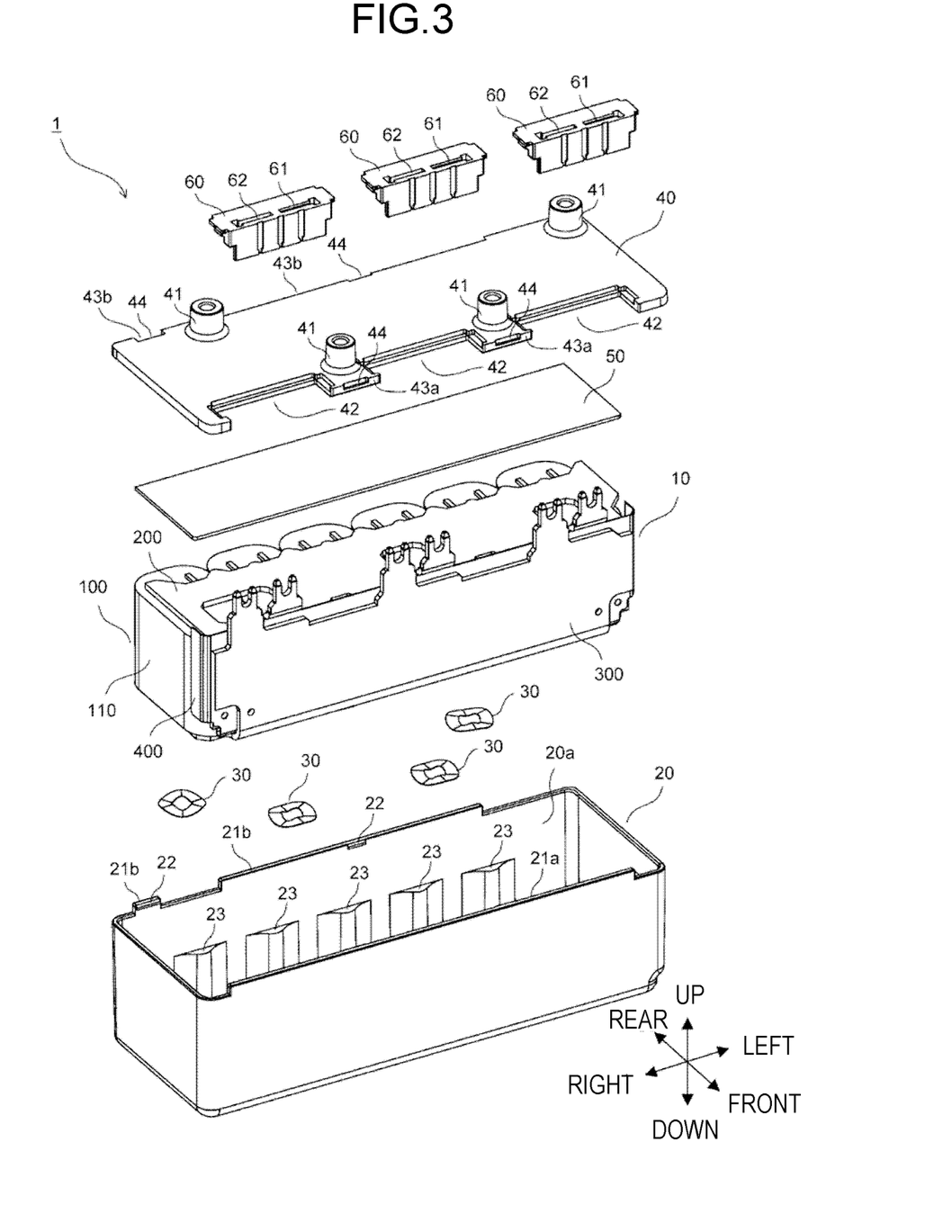
FIG. 3 is an exploded perspective view of the film capacitor according to the exemplary embodiment.
Figure 4:
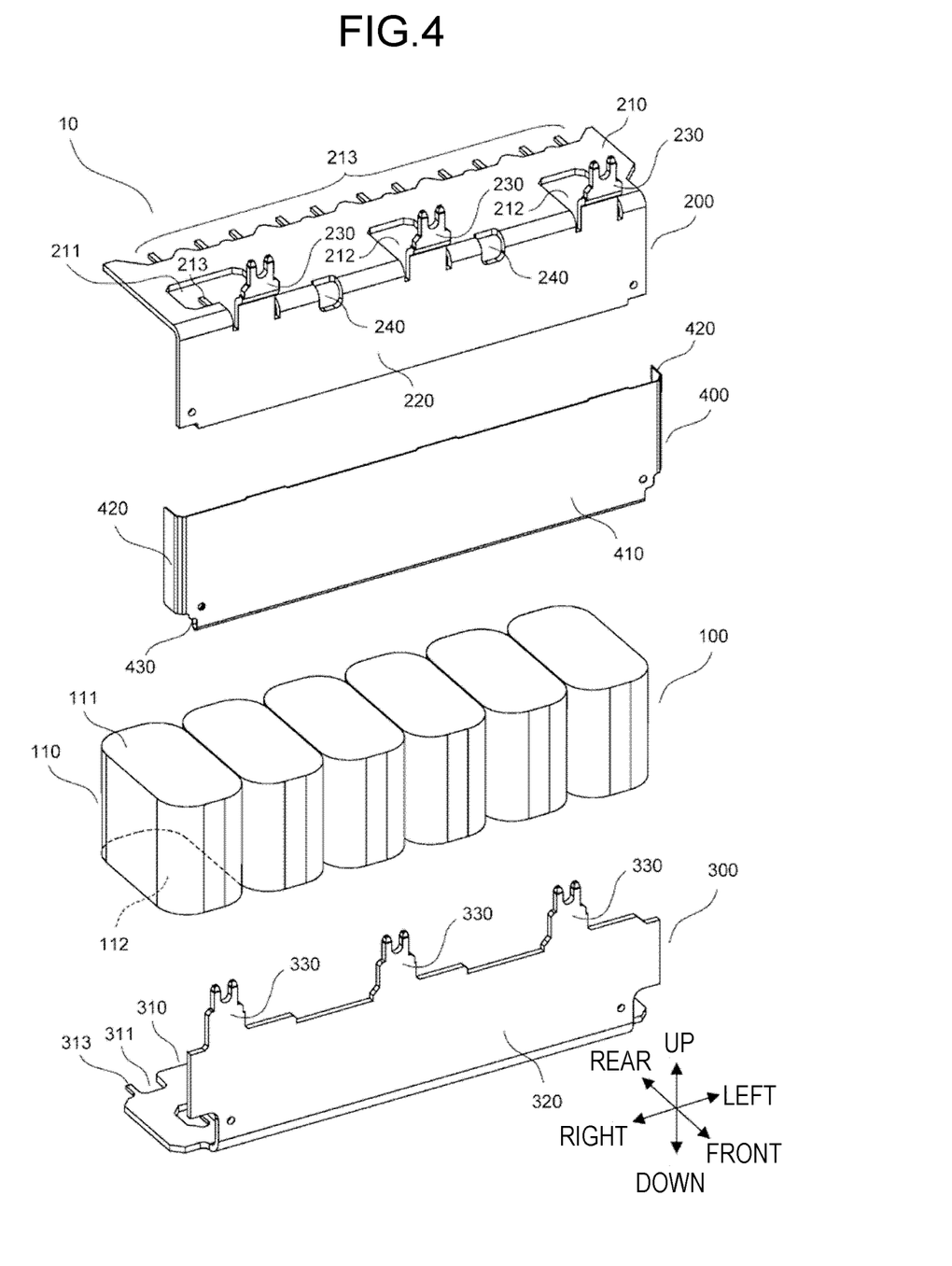
FIG. 4 is an exploded perspective view of a capacitor unit according to the exemplary embodiment.
Figure 5:
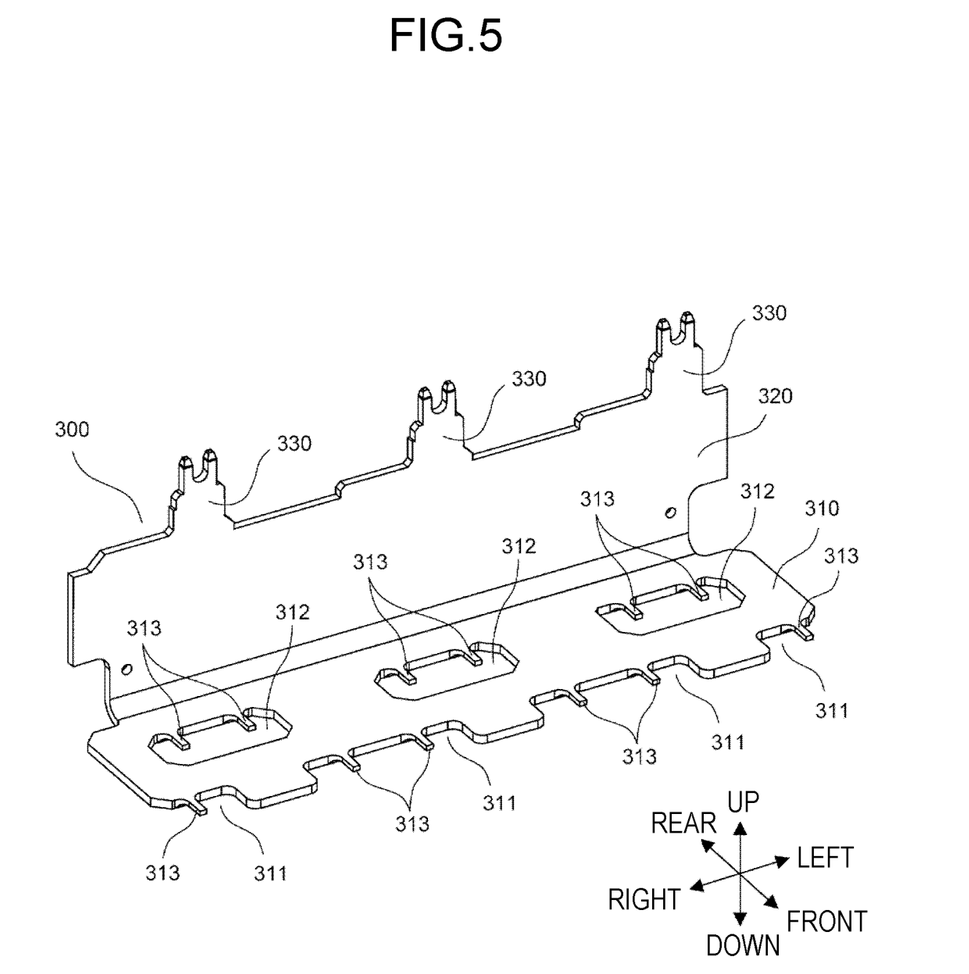
FIG. 5 is a rear perspective view of a lower bus bar according to the exemplary embodiment.
Figure 6:
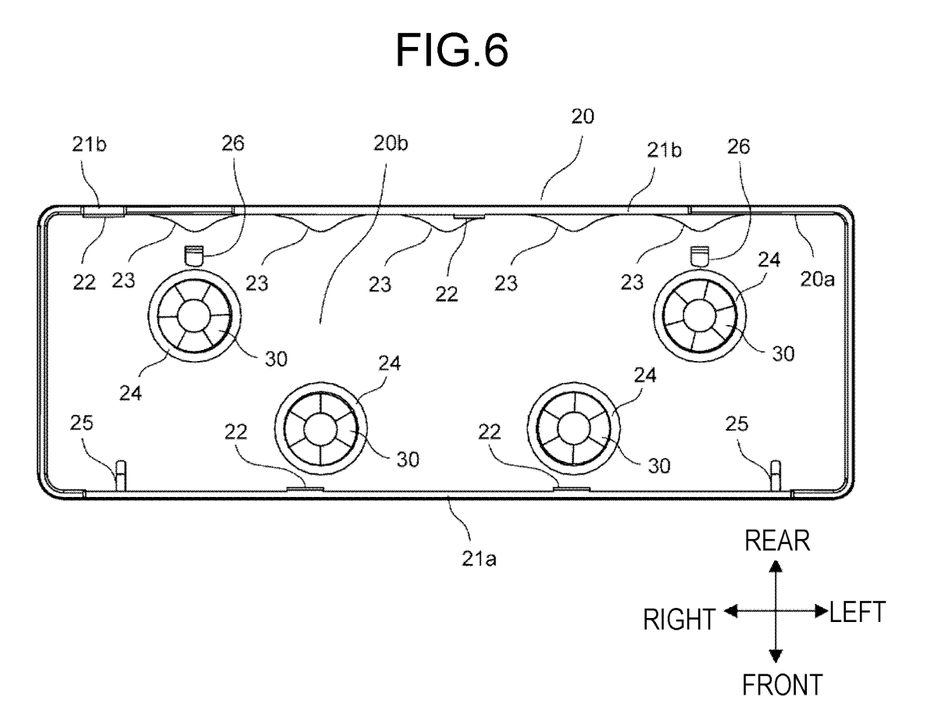
FIG. 6 is a plan view of a case equipped with plate springs according to the exemplary embodiment.

FIG. 1 is an elevation perspective view of film capacitor 1 according to the exemplary embodiment. FIG. 2A is a cross-sectional view of an essential part taken along line IIA-IIA of FIG. 1 according to the exemplary embodiment. FIG. 2B is a cross-sectional view of film capacitor 1 taken along line IIB-IIB of FIG. 1 according to the exemplary embodiment. FIG. 3 is an exploded perspective view of film capacitor 1 according to the exemplary embodiment. FIG. 4 is an exploded perspective view of capacitor unit 10 according to the exemplary embodiment. FIG. 5 is a rear perspective view of lower bus bar 300 according to the exemplary embodiment. FIG. 6 is a plan view of case 20 equipped with plate springs 30 according to the exemplary embodiment.

Figure 7:
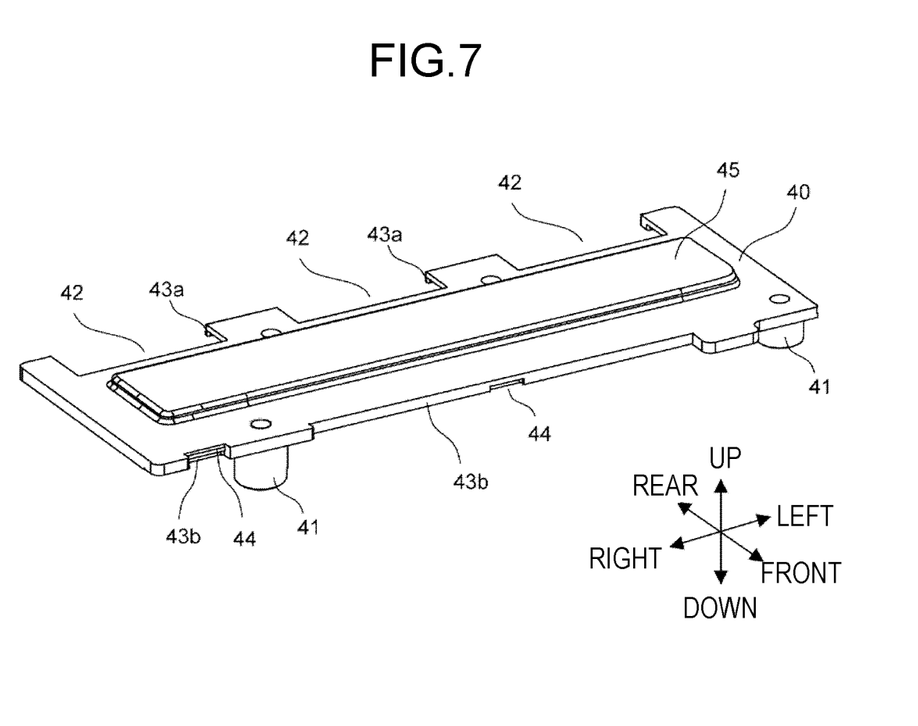
FIG. 7 is a perspective view of a cooling plate turned upside down according to the exemplary embodiment.

FIG. 7 is a perspective view of cooling plate 40 turned upside down according to the exemplary embodiment. In FIG. 2B, for convenience of clear illustration of plate springs 30, plate springs 30 in the drawing are not illustrated in cross-sectional view. Plate springs 30 behind the sectioning plane of the drawing are shown by dotted lines, and plate springs 30 are tinted. In the drawing, plate springs 30 that are compressed in actuality are not compressed but overlap lower bus bar 300 of capacitor unit 10.

With reference to FIG. 3, film capacitor 1 includes capacitor unit 10, case 20, four plate springs 30, cooling plate 40, insulating sheet 50, and three spacers 60.

Firstly, a configuration of capacitor unit 10 will be described. With reference to FIG. 4, capacitor unit 10 includes capacitor group 100, upper bus bar 200, lower bus bar 300, and insulating plate 400.

As shown in FIG. 4, capacitor group 100 includes a plurality of capacitor elements 110 arranged in a right-left direction. In the present exemplary embodiment, capacitor group 100 includes six capacitor elements 110 arranged in the right-left direction. Each of capacitor elements 110 is formed as follows: stacking two metalized films that are dielectric films on which aluminum is deposited; winding or layering the stacked metalized films; and pressing the wound or layered films into a flat shape. Capacitor elements 110 are arranged such that the respective end faces are directed in an up-down direction. Upper end electrodes 111 are formed on upper end faces of respective capacitor elements 110 by spraying metallikon metal such as zinc. Similarly, lower end electrodes 112 are formed on lower end faces of respective capacitor elements 110 by spraying metallikon metal such as zinc. Note that although each of capacitor elements 110 of the present exemplary embodiment is formed of metalized films that are dielectric films on which aluminum is deposited, capacitor element 110 may be formed of metalized films having different metal such as zinc or magnesium deposited on the films. Alternatively, each of capacitor elements 110 may be formed of metalized films having some of the above-described metals deposited on the films or may be formed of metalized films having an alloy of the above-described metals deposited on the films.

As shown in FIG. 4, upper bus bar 200 is formed from a conductive material such as a copper plate, and includes first electrode connector 210, first overlapping part 220, and three first connection terminals 230. Upper bus bar 200 is formed, for example, by appropriately cutting out and bending one copper plate. These first electrode connector 210, first overlapping part 220, and three first connection terminals 230 are integrated.

First electrode connector 210 is a plate-shaped part spanning laterally. First electrode connector 210 has first opening 211 and two second openings 212 that are each smaller than first opening 211. First opening 211 is formed on a left side of first electrode connector 210. Second openings 212 are formed on a middle section and a right side of first electrode connector 210, respectively. At a rear end of first electrode connector 210, 11 electrode terminals 213 are formed side by side in the right-left direction. One electrode terminal 213 is formed at a front edge of first opening 211.

First overlapping part 220 is a plate-shaped part spanning laterally and extending downward from a front end of first electrode connector 210. At a corner made by first electrode connector 210 and first overlapping part 220, third openings 240 are formed at a position between first opening 211 and middle-section second opening 212 and at a position between middle-section second opening 212 and right-side second opening 212, respectively. Third openings 240 are each smaller than second opening 212.

Three first connection terminals 230 are formed at predetermined intervals in the right-left direction and protrude upward from an upper end of first overlapping part 220. Terminals (not shown) from an external device are connected to first connection terminals 230 by a fixing process such as soldering.

As shown in FIGS. 4 and 5, lower bus bar 300 is formed from a conductive material such as a copper plate, and includes second electrode connector 310, second overlapping part 320, and three second connection terminals 330. Lower bus bar 300 is formed, for example, by appropriately cutting out and bending one copper plate. These second electrode connector 310, second overlapping part 320, and three second connection terminals 330 are integrated.

Second electrode connector 310 is a plate-shaped part spanning laterally. Second electrode connector 310 has indentations 311 that are formed at respective four locations. The locations are indented forward from a rear end of second electrode connector 310. Second electrode connector 310 has three openings 312 that are formed side by side in the right-left direction. Two electrode terminals 313 are formed at a front edge of each of two indentations 311 located at a middle section, whereas one electrode terminal 313 is formed at a front edge of each of two indentations 311 located at right and left ends of the second electrode connector. Two electrode terminals 313 are formed at a front edge of each of three openings 312.

Second overlapping part 320 is a plate-shaped part spanning laterally and extending upward from a front end of second electrode connector 310.

Three second connection terminals 330 are formed at predetermined intervals in the right-left direction and protrude upward from an upper end of second overlapping part 320. Terminals (not shown) from an external device are connected to second connection terminals 330 by a fixing process such as soldering.

With reference to FIG. 4, insulating plate 400 is formed from a resin material such as polyphenylene sulfide (PPS) and possesses insulating properties. Insulating plate 400 includes main body section 410 substantially identical in size to first overlapping part 220, side sections 420 extending rearward from right and left sides of main body section 410, and flap 430 being folded upward from a lower end of main body section 410 and facing main body section 410 at a distance equivalent to a thickness of first overlapping part 220.

When capacitor unit 10 is built, upper bus bar 200 and lower bus bar 300 are combined with each other such that first overlapping part 220 and second overlapping part 320 overlap each other at the front and the back and interpose insulating plate 400 between the overlapping parts. At the same time, a lower end of first overlapping part 220 of upper bus bar 200 is inserted between main body section 410 and flap 430 of insulating plate 400 (see FIG. 2B). This configuration reduces equivalent series inductance (ESL) because the first overlapping part 220 and second overlapping part 320 overlap each other. This configuration also ensures satisfactory creepage distance between upper bus bar 200 and lower bus bar 300 because of existence of side sections 420 and flap 430.

Capacitor group 100 is disposed between first electrode connector 210 and second electrode connector 310 of upper bus bar 200 and lower bus bar 300 that are combined to each other. Then, 12 electrode terminals 213 of first electrode connector 210 are connected to upper end electrodes 111 of capacitor elements 110 by a fixing process such as soldering, and 12 electrode terminals 313 of second electrode connector 310 are connected to lower end electrodes 112 of capacitor elements 110 by a fixing process such as soldering. Accordingly, capacitor unit 10 is completed as shown in FIG. 3.

A configuration of case 20, plate springs 30, cooling plate 40, insulating sheet 50, and spacers 60 will now be described.

With reference to FIGS. 3 and 6, case 20 is formed from a resin material such as PPS. Case 20 is a box-shaped part of a substantially rectangular parallelepiped having an opened upper face and spanning laterally. Front projection 21a is formed on a front side of an upper end of case 20 so as to project slightly upward. Rear projections 21b are formed at two locations on a rear side of the upper end of case 20 so as to project slightly upward. Fitting pawls 22 are formed at respective two locations of front projection 21a and at one location of each of rear projections 21b, so as to protrude inward of case 20.

On inner rear surface 20a of case 20, five mountain-shaped projections 23 are formed side by side in the right-left direction and project inward of case 20. Projections 23 project into a space between capacitor group 100 contained in case 20 and inner rear surface 20a of case 20. This configuration can decrease the space and thus reduce a quantity of filler resin 70 (see FIG. 2B) with which case 20 is filled.

Annular fixed ribs 24 are formed at respective four locations on inner bottom surface 20b of case 20 so as to protrude toward the opened face of case 20. Fixed ribs 24 are formed at positions that do not overlap openings 312 of second electrode connector 310 of lower bus bar 300, i.e., at positions that face a section of second electrode connector 310 except openings 312, while capacitor unit 10 is contained in case 20. This configuration enables plate springs 30 installed in fixed ribs 24 to be properly pressed against lower bus bar 300. An inside diameter of each fixed rib 24 is substantially equal to an outside diameter of each plate spring 30. First positioning ribs 25 are formed on right and left sides of inner bottom surface 20b adjacent to a front end of case 20, whereas second positioning ribs 26 are formed on right and left sides of inner bottom surface 20b adjacent to a rear end of case 20.

With reference to FIGS. 3 and 6, four plate springs 30 are formed from a metallic material such as stainless steel (SUS), and are each formed into an annular and circumferentially wavy shape. Plate springs 30 are contained inside respective fixed ribs 24.

With reference to FIGS. 3 and 7, cooling plate 40 is formed from a metal material with excellent heat dissipation (thermal conductivity), such as aluminum. Cooling plate 40 is substantially identical in size to the upper face of case 20. Mounting bosses 41 are formed at four locations on an upper surface of cooling plate 40. Attachment openings 42 are formed at three locations on a front end of cooling plate 40 to be disposed side by side in the right-left direction. Attachment openings 42 serve as pathways for first connection terminals 230 of upper bus bar 200 and second connection terminals 330 of lower bus bar 300, and as parts to which spacers 60 are attached.

Front indentation faces 43a are formed between left attachment opening 42 and middle attachment opening 42 and between right attachment opening 42 and middle attachment opening 42, and are indented rearward from a front end surface of cooling plate 40 by a thickness of front projection 21a of case 20. Rear indentation faces 43b are formed at locations corresponding to two rear projections 21b and are indented forward from a rear end of cooling plate 40 by a thickness of each rear projection 21b. Fitting slots 44 are formed in two front indentation faces 43a and two rear indentation faces 43b respectively, and are compatible with fitting pawls 22 of case 20.

Protrusion surface 45, which is substantially rectangular and protrudes downward, is formed on a backside of cooling plate 40.

A cooler, which is provided in an external device in which film capacitor 1 is disposed, is connected to cooling plate 40. If the cooler includes a cooling part through which a refrigerant flows, the cooling part is fixed to mounting bosses 41 of cooling plate 40 with screws or other fasteners.

With reference to FIG. 3, insulating sheet 50 is formed from a resin material that possesses insulating properties and surpasses at least insulating paper in heat dissipation (thermal conductivity), such as an acrylic resin or silicon. Insulating sheet 50 is rectangular and slightly larger in size than protrusion surface 45 of cooling plate 40.

With reference to FIG. 3, three spacers 60 are formed from a resin material such as PPS and possess insulating properties. First slit 61 and second slit 62 are formed in each spacer 60. First connection terminals 230 of upper bus bar 200 pass through respective first slits 61. Second connection terminals 330 of lower bus bar 300 pass through respective second slits 62.

At the time of building film capacitor 1, four plate springs 30 are firstly mounted on inner bottom surface 20b of case 20. In other words, plate springs 30 are put inside fixed ribs 24 at respective four locations on inner bottom surface 20b of case 20. Meanwhile, as shown in FIG. 2B, each plate spring 30 partly protrudes from each fixed rib 24 toward the opened face of case 20 because plate springs 30 are each formed into a wavy shape in the circumferential direction as described above. Then, capacitor unit 10 is put in case 20. At this time, capacitor unit 10 is placed on four plate springs 30. Capacitor unit 10 is positioned in the right-left direction by first positioning ribs 25 and in a front-rear direction by second positioning ribs 26 (see FIG. 2B).

Next, molten filler resin 70 (e.g., epoxy resin) is injected from above into case 20 containing capacitor unit 10. Meanwhile, filler resin 70 is distributed through first, second, and third openings 211, 212, and 240 of upper bus bar 200 and openings 312 of lower bus bar 300 such that filler resin 70 is spread evenly inside case 20. Filler resin 70 is charged to a level (see a dot-and-dash line in FIG. 2B) slightly above upper bus bar 200. Immediately after case 20 is filled with filler resin 70, cooling plate 40 to which insulating sheet 50 is affixed is mounted on the upper face of case 20. As a result, insulating sheet 50 is placed over upper bus bar 200. Then, three spacers 60 are attached to three attachment openings 42 of cooling plate 40. As shown in FIG. 2A, fitting pawls 22 at the four locations of case 20 fit vertically with fitting slots 44 (bottoms of the slots) at the four locations of cooling plate 40. This configuration prevents cooling plate 40 from moving upward and thus hinders cooling plate 40 from being separated upward from case 20. Three spacers 60 determine positioning between first and second connection terminals 230 and 330 and cooling plate 40. Cooling plate 40 is adjacent to capacitor unit 10 in case 20.

With reference to FIG. 2B, cooling plate 40 mounted on case 20 presses capacitor unit 10 downward and compresses plate springs 30 downward. As a result, plate springs 30 apply an elastic force to capacitor unit 10 upward, i.e., in a direction toward cooling plate 40. Upper bus bar 200, i.e., capacitor unit 10, is intensively pressed against cooling plate 40 via insulating sheet 50. Even if molten filler resin 70 is interposed between cooling plate 40 and capacitor unit 10, more specifically, between cooling plate 40 (protrusion surface 45) and insulating sheet 50 and between insulating sheet 50 and capacitor unit 10 (upper bus bar 200), the pressing force by plate springs 30 eliminates filler resin 70 outward. Consequently, a layer of filler resin 70 is less apt to be formed between cooling plate 40 and capacitor unit 10.

Timing with which filler resin 70 is injected into case 20 may be after mounting of cooling plate 40 other than before mounting of cooling plate 40 as described above. In this case, cooling plate 40 is provided with an injection port through which filler resin 70 is injected. In this case, an elastic force by plate springs 30 causes capacitor unit 10 to be intensively pressed against cooling plate 40 via insulating sheet 50. This configuration hampers injected filler resin 70 from entering between capacitor unit 10 and cooling plate 40. Consequently, a layer of filler resin 70 is less apt to be formed between capacitor unit 10 and cooling plate 40.

Accordingly, when filler resin 70 within case 20 is cooled and solidified, film capacitor 1 shown in FIG. 1 is completed. Preferably, cooling plate 40 and case 20 are fixed to each other with screws or any other fixing method so as to ensure that cooling plate 40 is not detached from case 20.

If film capacitor 1 is installed in an external device and electric current flows through capacitor group 100, capacitor group 100 generates heat. Heat generated from capacitor group 100 is discharged into a cooler of the external device connected to cooling plate 40 through upper bus bar 200, insulating sheet 50, and cooling plate 40. In other words, capacitor elements 110 are cooled by the cooler through cooling plate 40, insulating sheet 50, and upper bus bar 200. This configuration prevents temperature rise of capacitor elements 110. Meanwhile, filler resin 70 is less likely to be interposed between capacitor unit 10 and cooling plate 40, and thus an impairment of heat dissipation due to filler resin 70 between capacitor unit 10 and cooling plate 40 is less apt to occur.

Effects of Exemplary Embodiment

As described above, in accordance with the present exemplary embodiment, the following effects are exerted.

Plate springs 30 are provided inside case 20, and an elastic force by plate springs 30 causes capacitor unit 10 to be pressed against cooling plate 40. This configuration hampers filler resin 70 from being interposed between capacitor unit 10 and cooling plate 40. As a result, an impairment of heat dissipation due to filler resin 70 between capacitor unit 10 and cooling plate 40 is less apt to occur, which enables a satisfactory cooling of capacitor elements 110.

Molten filler resin 70 injected into case 20 has a high temperature. However, since plate springs 30 that act as an elastic body to apply an elastic force are metallic springs, there is no concern about deterioration and the like resulting from exposure to a high temperature, unlike a case of using a rubber elastic body.

Plate springs 30 are surrounded with fixed ribs 24 on inner bottom surface 20b of case 20 and thus are fixed so as not to move along inner bottom surface 20b (in the front-rear and right-left directions). This configuration prevents plate springs 30 from being positionally deviated as a result of being pushed by a flow of filler resin 70 injected into case 20. This enables plate springs 30 to be pressed against proper positions on capacitor unit 10 (positions except openings 312 on lower bus bar 300).

Insulating sheet 50 is interposed between cooling plate 40 and upper bus bar 200. This configuration prevents electric current flowing through upper bus bar 200 from leaking into cooling plate 40 even when filler resin 70 is hampered from being interposed between cooling plate 40 and upper bus bar 200.

Fitting pawls 22 of case 20 fit tightly together with the fitting slots to thereby prevent cooling plate 40 from moving upward, i.e., in the direction of an elastic force by plate springs 30. Thus, capacitor unit 10 can be firmly pressed against cooling plate 40 by the elastic force.

Although the exemplary embodiment of the present invention has been described above, the present invention is not limited to the exemplary embodiment described above, and moreover, a variety of modifications can be applied to application examples according to the present invention besides the exemplary embodiment described above.

In the exemplary embodiment described above, plate springs 30 are used as an elastic body that applies an elastic force to capacitor unit 10, for example. However, the elastic body is not limited to this example, and metallic coil springs may be used. Alternatively, a rubber elastic body may be used as long as the elastic body is resistant to high temperature and causes no concern about deterioration.

A number of capacitor elements 110 that constitute capacitor group 100 can be changed as appropriate depending on required electrical capacity, without being limited to the number specified in the above-described exemplary embodiment. In other words, six capacitor elements 110 are disposed in the above-described exemplary embodiment, but the number of capacitor elements 110 is not limited to six. Any other number of capacitor elements 110 may be disposed including a case where only one capacitor element 110 is disposed.

In the exemplary embodiment described above, case 20 is provided with fitting pawls 22, and fitting pawls 22 fit tightly together with fitting slots 44 formed in cooling plate 40. However, a configuration of fitting is not limited to this example. Case 20 may be provided with fitting slots that constitute a fitting part, and the fitting slots may fit tightly together with fitting pawls formed on cooling plate 40, for example.

In the exemplary embodiment described above, plate springs 30 are fixed to inner bottom surface 20b of case 20 with annular fixed ribs 24. However, the method of fixing the springs is not limited to this example. For example, a projection compatible with an opening at a center of each plate spring 30 may be formed on inner bottom surface 20b of case 20 to serve as a fastener and the opening of each plate spring 30 may be put on the projection, so that plate springs 30 are fixed.

Each of capacitor elements 110 is formed by stacking two metalized films that are dielectric films on which aluminum is deposited, and winding or layering the stacked metalized films. Alternatively, each of capacitor elements 110 may be formed by making a metalized film that is a dielectric film on both sides of which aluminum is deposited, stacking the metalized film and an insulating film, and winding or layering the stacked films.

In the exemplary embodiment described above, film capacitor 1 is taken as an example of the capacitor according to the present invention. However, the present invention can be applied to any capacitor other than film capacitor 1.

In addition, the exemplary embodiment of the present invention can be modified in various ways as appropriate within the scope of the technical idea disclosed in the claims.

Note that in the description of the above-described exemplary embodiment, a term indicating a direction, such as "upward" or "downward", indicates a relative direction that only depends on a relative positional relationship of constituent members, and does not indicate an absolute direction, such as a vertical direction or a horizontal direction.

The present invention is useful for capacitors such as film capacitors used for various electric components of electronic devices, electric devices, industrial devices, vehicles, or the like.

What is claimed is:

1. A film capacitor comprising:
a capacitor unit including a capacitor element, and a first bus bar and a second bus bar that are respectively connected to electrodes of the capacitor element;
a case containing the capacitor unit and being filled with a resin;
a heat dissipater disposed near the capacitor unit, the heat dissipater being connected to a cooler for discharging heat generated from the capacitor element into the cooler; and
an elastic body disposed in an inner surface of the case and applying an elastic force to the capacitor unit in a direction toward the heat dissipater, wherein:
the second bus bar disposed between the elastic body and the capacitor unit,
the heat dissipater having a protrusion protruding from a bottom face of the heat dissipater facing the capacitor unit toward the capacitor unit,
a bottom of the protrusion is in contact with the resin,
an upper boundary of the resin is disposed at the protrusion, and
the elastic body is in contact with the second bus bar.

2. The film capacitor according to claim 1, wherein
the case has an opening face,
the heat dissipater is disposed closer to the opening face of the case than the capacitor unit is, and
the elastic body is disposed between the capacitor unit and an inner surface of the case that is on an opposite side to the opening face.

3. The film capacitor according to claim 1, wherein the elastic body includes a metallic spring.

4. The film capacitor according to claim 1, wherein
the elastic body is disposed on the inner surface of the case, and
the inner surface of the case is provided with a fastener that fixes the elastic body to the inner surface so as to prevent the elastic body from moving on the inner surface of the case.

5. The film capacitor according to claim 4, wherein
the fastener is a rib that protrudes from the inner surface of the case, and
the elastic body is surrounded with the rib to be fixed to the inner surface so as not to move on the inner surface of the case.

6. The film capacitor according to claim 1, wherein
the heat dissipater is disposed near the first bus bar, and
an insulating member is interposed between the heat dissipater and the first bus bar.

7. The film capacitor according to claim 1, wherein the case is provided with an engagement part, the engagement part being engaged with the heat dissipater and preventing the heat dissipater from moving in a direction of the elastic force by the elastic body.

8. The film capacitor according to claim 1, wherein a space is disposed between a part of the bottom surface other than the protrusion and the upper boundary of the resin.

9. The film capacitor according to claim 1, wherein the upper boundary of the resin is disposed between a part of the bottom surface other than the protrusion and the bottom of the protrusion.

10. The film capacitor according to claim 1, wherein the capacitor unit disposed between the first bus bar and the second bus bar.

11. A film capacitor comprising:
a capacitor unit including a capacitor element, and a first bus bar and a second bus bar that are respectively connected to electrodes of the capacitor element;
a case containing the capacitor unit and being filled with a resin;
a heat dissipater disposed near the capacitor unit, the heat dissipater being connected to a cooler for discharging heat generated from the capacitor element into the cooler; and
an elastic body applying an elastic force to the capacitor unit in a direction toward the heat dissipater, wherein:
the case has an opening face,
the heat dissipater is substantially identical in size to the opening face of the case,
the heat dissipater having a protrusion protruding from a bottom face of the heat dissipater facing the capacitor unit toward the capacitor unit,
a bottom of the protrusion is in contact with the resin, and
an upper boundary of the resin is disposed at the protrusion.

* * * * *